US006172326B1

(12) United States Patent
Chang et al.

(10) Patent No.: US 6,172,326 B1
(45) Date of Patent: Jan. 9, 2001

(54) PROCESS AND AN APPARATUS FOR JOINING FASTENING ELEMENTS ON THE MASK FRAME OF PICTURE TUBES

(75) Inventors: Jin-Kook Chang; Günter Heine; Herbert Jahn, all of Berlin (DE)

(73) Assignee: Samsung Display Devices Co., Ltd., Kyungki-Do (KR)

( * ) Notice: Under 35 U.S.C. 154(b), the term of this patent shall be extended for 0 days.

(21) Appl. No.: 09/217,989

(22) Filed: Dec. 22, 1998

(30) Foreign Application Priority Data

Feb. 6, 1998 (DE) ............................................ 198 06 321

(51) Int. Cl.[7] ............................................ B23K 26/22
(52) U.S. Cl. ........................ 219/121.64; 313/402; 445/30
(58) Field of Search .............................. 445/30; 313/405, 313/406, 407, 402; 219/121.63, 121.64

(56) References Cited

U.S. PATENT DOCUMENTS 4,162,390 * 7/1979 Kelly .............................. 219/121.63
4,828,523 * 5/1989 Fendley et al. ........................ 445/30
4,854,905 * 8/1989 Shibuya et al. ........................ 445/30
5,013,275 * 5/1991 Kautz .............................. 219/121.63
5,576,595 * 11/1996 Inoue .................................. 313/402

FOREIGN PATENT DOCUMENTS

3620585 * 12/1987 (DE) ................................ 219/121.64
4208319 9/1993 (DE) .

* cited by examiner

*Primary Examiner*—Geoffrey S. Evans
(74) *Attorney, Agent, or Firm*—Leydig, Voit & Mayer, Ltd.

(57) ABSTRACT

A process and a device for the joining of fastening elements on a mask frame of picture tubes by welding using laser beams is applicable to the production of color picture tubes for television sets and computer monitors. After positioning the fastening elements, the elements are welded by laser beams from at least one laser source. The laser source is located outside the mask frame, and the laser beam is guided through a glass wall of a screen to weld the fastening elements.

11 Claims, 3 Drawing Sheets

PROCESS AND AN APPARATUS FOR JOINING FASTENING ELEMENTS ON THE MASK FRAME OF PICTURE TUBES

The invention relates to a process and a device for joining fastening elements belonging to the mask frame subassembly of picture tubes by welding with the aid of laser beams and is applicable in the production of color picture tubes.

In the production of color picture tubes, the installation of the mask frame subassembly in the screen part requires special attention. Of decisive importance is not only the defined position of the mask in relation to the screen part's inner contour, but also the repeated reproducible installation of the subassembly.

As the mask is used for the exposure of photoresists and phosphor layers, the reproducibility of repeated installations in exactly the same position determines the color quality of the finished picture tube.

To install the mask frame subassembly in the screen part, the walls of the screen part include pins which are fused therein with high positional accuracy. To hold the mask frame subassembly, the subassembly normally features four resilient bimetallic holders, one end of each of which is firmly welded to the frame while the other end has a mating hole which fits onto the pin. To prevent the tolerances in the pin positions and in the holders from causing distortion of the installed mask frame subassembly, one holder on one of the long side walls of the subassembly does not feature a mating hole. Instead, this holder has an enlarged, aperture to permit the completely distortion-free engagement of the mask frame subassembly. The subassembly is then fixed in this position by a fixing washer which features a mating hole and is pressed by the holder onto the pin. By welding together the fixing washer and holder, the distortion-free condition of the mask frame subassembly in the screen part is maintained, thus ensuring the reproducibility of multiple re-installations.

In accordance with the known prior art, the fixing washer and holder are joined using a resistance welding process. In this process, problems occur due to weld spatters, which arise almost inevitably, causing damage to the glass part. Furthermore, distortion of the mask frame subassembly in the downstream high-temperature process steps may arise due to the different treatment of the various holders as a consequence of the welding process. This may result in a deterioration in the picture tube optical parameters.

To prevent such effects, a process is known from DE 42 08 319 A1 for the tension-free joining of the fixing washer and holder. In this process, the washer and holder are joined using laser welding technology. The laser beam is guided in this process from the inside of the frame-mask combination. It strikes the side of the holder facing the frame, the holder being provided with so-called welding ducts. Welding is performed on the edges of the welding ducts facing the fixing washer.

A drawback of this process is that, as a result of the positioning of the laser source within the mask frame, not every desired point of the fixing washer-holder combination can be welded, because shadows are cast by the frame. A special arrangement of weld spots therefore has to be selected. Moreover, the choice of welding ducts, which also have to be inclined according to the incident laser beam, places extreme demands on the positional accuracy of the washer and holder, on the adjustment of the overall device, and on the production of the welding ducts themselves.

SUMMARY OF THE INVENTION

The object of the present invention is to provide a process and a device for joining fastening elements on the mask frame of picture tubes by means of which a permanent joint is established between the fixing washer and holder, which prevents the occurrence of all weld spatters and in which the connection process does not entail distortion of the mask frame subassembly. Furthermore, no structural modifications of the joining elements are to be undertaken and the requirements of adjustment precision in the welding process are to be kept as low as possible.

According to the invention, this object is achieved with the aid of a laser without any structural modifications of the elements being effected. In this process, the laser beam is focused on the fixing washer through the screen glass wall and welding is performed with spot welds. Surprisingly, by taking the precautions specified according to the invention, there is no damage to the glass nor are there any other effects.

A special advantage of the invention is that it rationalizes and renders effective the picture tube production process by welding the fastening elements after positioning with laser beams from at least one laser source, with the laser source positioned outside the mask frame. The laser beams are guided before welding through the glass wall of the screen trough. The use of spot welds has proven beneficial.

As the welding process can be performed directly on the assembled screen part without any separation of the frame-mask subassembly or any other manipulation of the subassembly having to be performed, the process can be executed automatically, utilizing the existing transfer systems. As no mechanical modification of the position of the fastening elements at all is undertaken during the welding process, it is possible to achieve a distortion-free condition.

BRIEF DESCRIPTION OF THE DRAWINGS

The invention will be illustrated in more detail below with reference to the embodiments at least partially presented in the figures.

DETAILED DESCRIPTION OF THE PREFERRED EMBODIMENTS

Figure 1A:
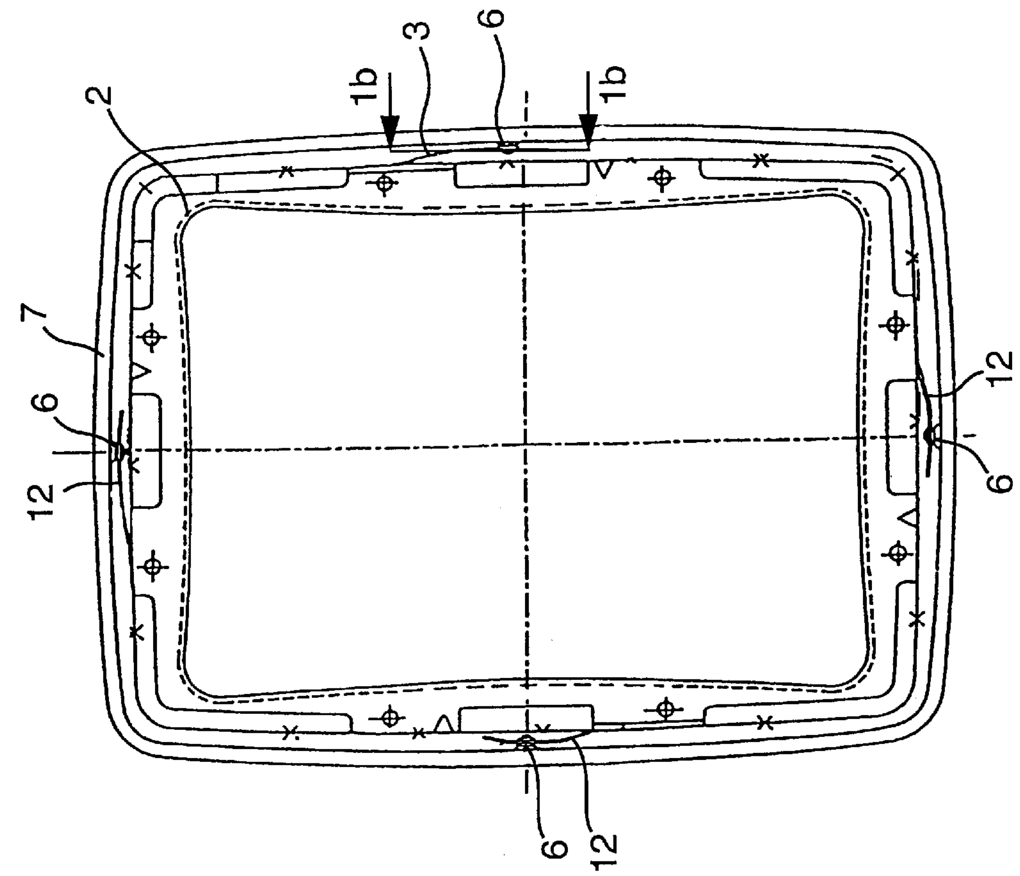
FIG. 1A is a view of the mask frame subassembly of a color picture tube engaged in a screen part
Figure 1B:
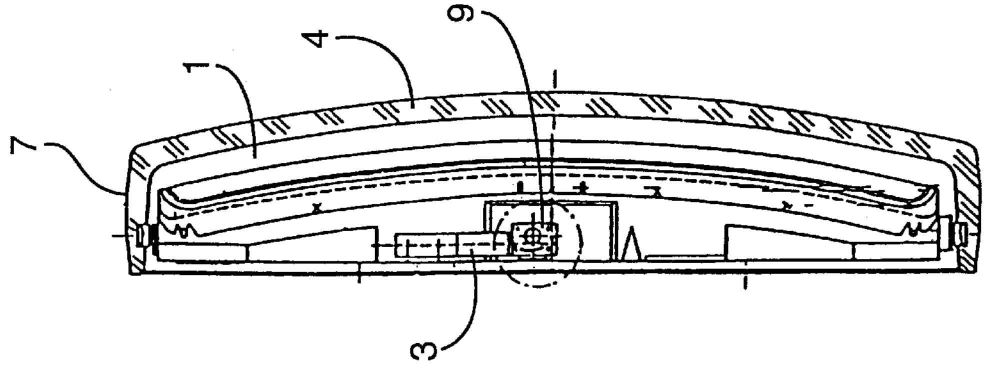
FIG. 1B is a cross-sectional view taken along line 1B—1B of FIG. 1A
Figure 1C:
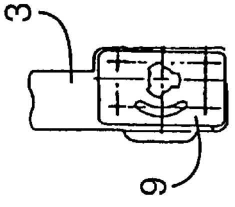
FIG. 1C is a detail view of part of FIG. 1B
Figure 2:
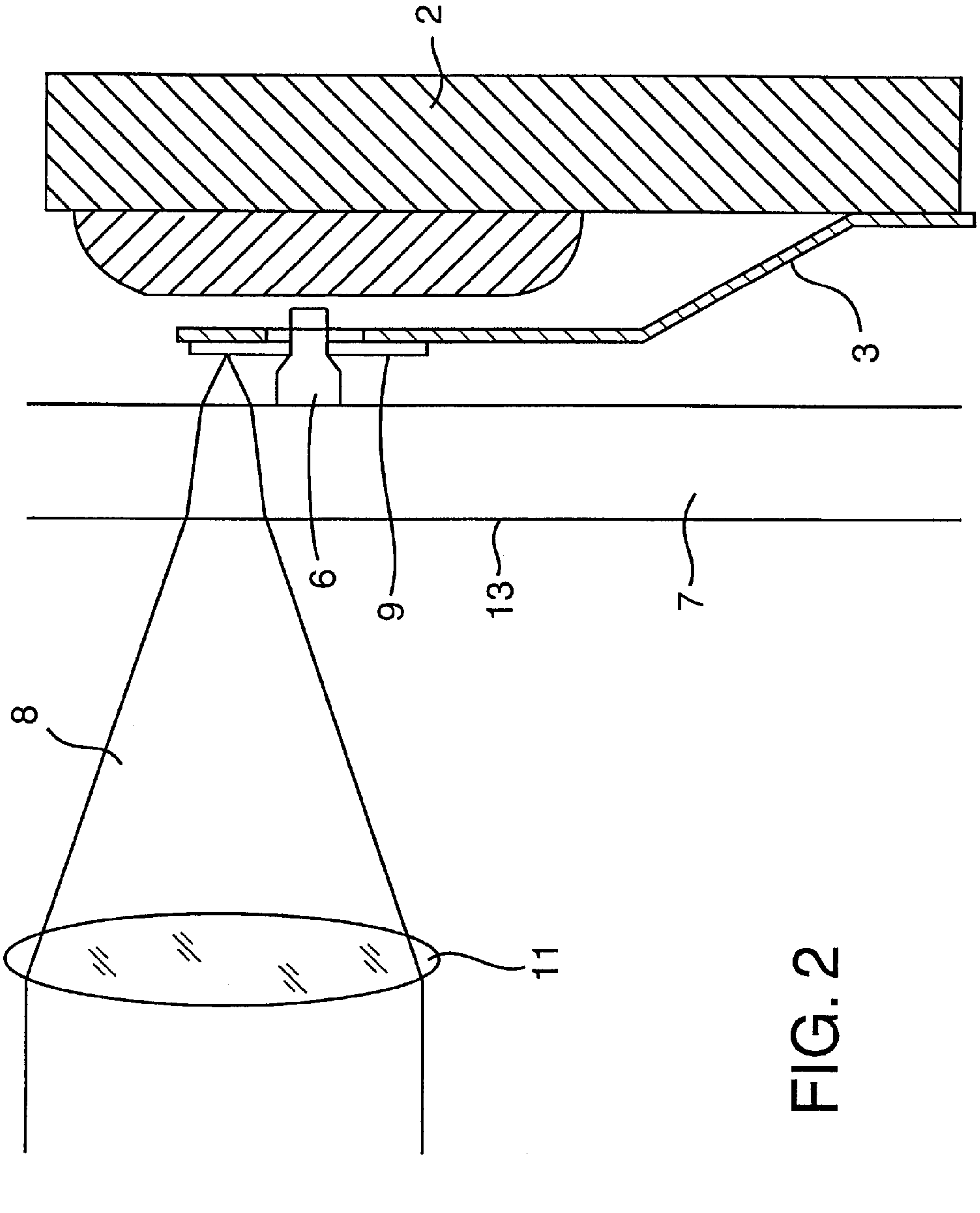
FIG. 2 is a diagram of the principle of the process for joining a holder and fixing washer of color picture tubes by laser welding.

The frame-mask subassembly is presented in FIG. 1 and consists of the mask frame 2 with the welded-on mask 1 and the three welded-on holders 12 each with a mating hole, as well as the fourth holder 3 with an enlarged aperture. This frame-mask subassembly is engaged by an inserter in the screen part 4 with screen part wall 7. The pins 6 fused into screen part 4 determine the exact position of the frame-mask subassembly in relation to the screen interior surface. To fix this position, a fixing washer 9 with a mating hole is pushed onto pin 6 belonging to holder 3 with an enlarged aperture. This fixing washer 9 is pressed firmly onto pin 6 by holder 3. The structural design of fixing washer 9 and holder 3 ensures close contact between both parts. A permanent connection is then established by laser welding. In this process, as illustrated in FIG. 2, the laser is positioned in such a way that the laser beam 8 is focused on the fixing washer 9 by a laser optical system 11 through the glass wall of screen part 4. The glass wall merely shifts the focal point towards the normal. As the fixing washer 9 is sufficiently large, the requirements with respect to positional accuracy of screen part 4 are low. The energy of the laser, an Nd:YAG laser in the present embodiment, can be applied either in a single pulse of appropriate power or in pulsed CW mode.

To ensure a focused image and avoid unnecessarily high laser power, it has proven beneficial for the exterior wall of screen part 4 not to feature stippling (high surface roughness) at least in the area of laser impact 13. In accordance with the desired position of the spot welds, the welds are performed in series or, with a suitable choice of focusing unit, simultaneously in parallel. Any tension occurring in the glass can be relieved by a heat treatment practiced anyway during the process of picture tube production.

Figure 3:
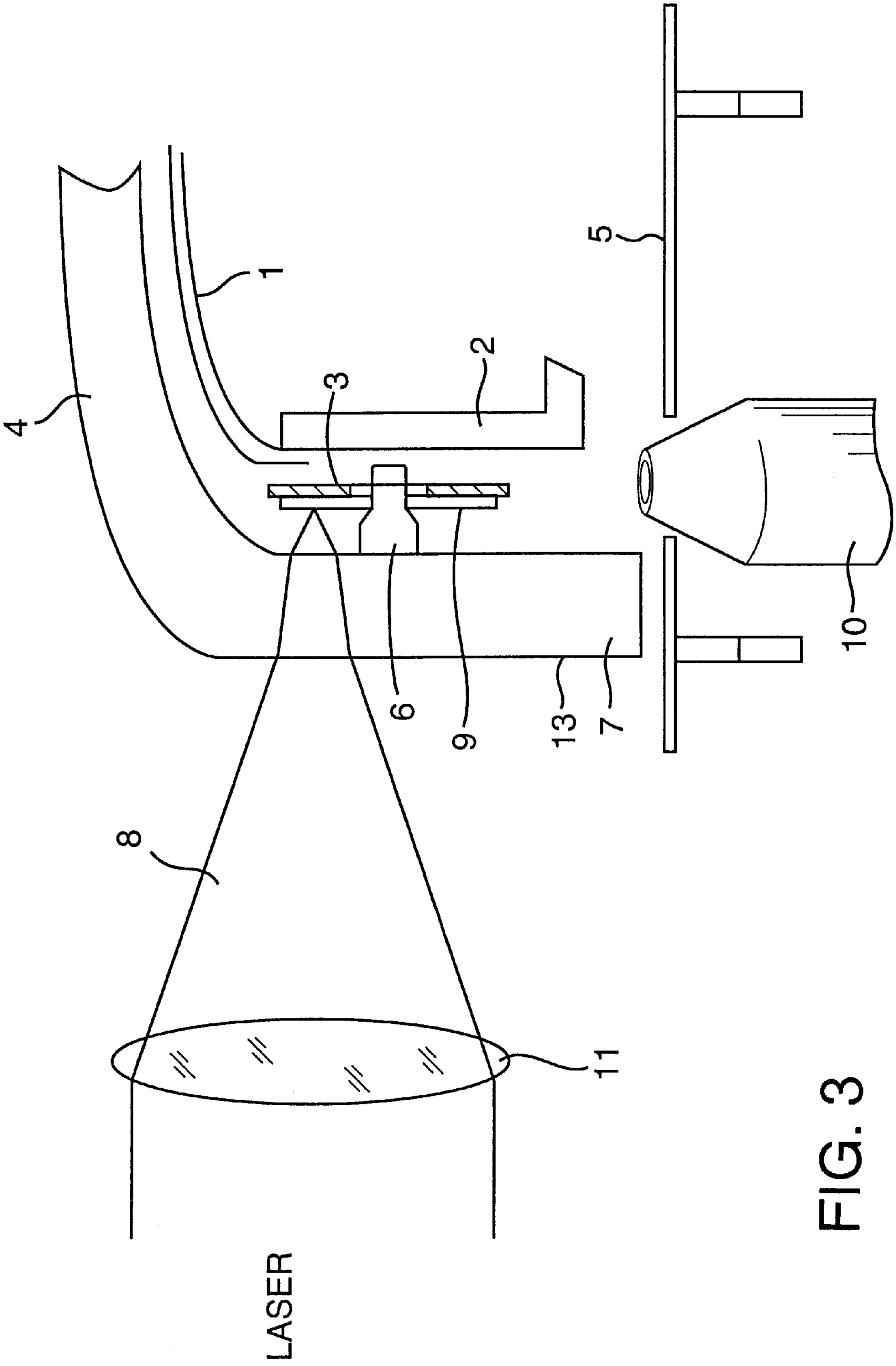
FIG. 3 is a schematic diagram of the laser welding device and the set-up for a vacuum device.

FIG. 3 shows a schematic diagram of the laser welding device. All the elements already mentioned in the description of the process can be found here as well. Worthy of special note is the design of the device where a suitable vacuum device 10 is used, which is to be positioned and dimensioned in such a way that the vapors (smog) arising during welding are exhausted completely. In the present embodiment, the vacuum device 10 is positioned in such a way that it acts through the transfer belt 5 on which the mask frame subassemblies arranged in the screen parts are conveyed during the ongoing process. Without such a device, deposits will form on the interior glass wall, which results in increased absorption of laser radiation in this area, which in turn may cause, in extreme cases irreparable, damage to the glass. Furthermore, care must be taken by qualified focusing of the laser beam 8 so that the laser beam 8 does not strike the pin 6.

The invention is not limited to the embodiments presented herein. In fact, it is possible, by combining and modifying the means and features cited, to realize further alternative embodiments without departing from the scope of the invention.

What is claimed is:

1. A process for joining fastening elements on a mask frame to fix a mask frame subassembly in a screen of a color picture by welding the fastening elements with laser beams comprising:

positioning the fastening elements; and welding the fastening elements with laser beams from at least one laser source, the laser source being arranged outside the screen, the laser beams penetrating a glass wall of the screen before welding.

2. The process according to claim 1 comprising spot welding.

3. The process according to claim 1 including using an Nd:YAG laser as the laser source in a pulse mode or in a pulsed CW mode.

4. The process according to claim 1 including focusing the laser beam to prevent contact between the laser beam and a pin of the mask frame subassembly.

5. The process according to claim 1 wherein the glass wall penetrated by the laser beam has low surface roughness.

6. The process according to claim 1 including relieving stress in the glass wall of the screen after the laser welding.

7. The process according to claim 6 including relieving stress in the glass wall by a heat treatment practiced during picture tube production.

8. The process according to claim 1 including removing gases arising during laser welding.

9. The process according to claim 1, wherein the fastening elements include a fixing washer and a holder that are welded together and neither the fixing washer nor the holder is in direct contact with the screen.

10. An apparatus for the laser welding of holders or fixing washers on a mask frame of a color picture tube, the mask frame engaging a screen of the color picture tube, the apparatus including:

a laser source opposite a fixing washer to be welded and located behind a screen wall of the screen so that a laser beam from the laser source penetrates the screen wall before being incident upon the fixing washer; and a vacuum device including a transfer belt, the vacuum device removing gases during laser welding.

11. The apparatus according to claim 10, wherein neither the fixing washer nor the holder is in direct contact with the screen.

* * * * *